(12) United States Patent
Hess

(10) Patent No.: US 7,076,713 B1
(45) Date of Patent: Jul. 11, 2006

(54) TEST GENERATOR FOR CONVERTING A MODEL OF COMPUTER COMPONENT OBJECT BEHAVIOR AND STIMULUS VALUES TO TEST SCRIPT

(75) Inventor: Gary C. Hess, Lincroft, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1080 days.

(21) Appl. No.: 09/702,963

(22) Filed: Oct. 31, 2000

(51) Int. Cl.
*G01R 31/28* (2006.01)
*G06F 11/00* (2006.01)

(52) U.S. Cl. .................................................... 714/741

(58) Field of Classification Search ................ 714/724, 714/725, 726, 741, 742, 30
See application file for complete search history.

(56) References Cited

U.S. PATENT DOCUMENTS 5,745,501 A * 4/1998 Garner et al. ................ 714/741
5,983,001 A * 11/1999 Boughner et al. ............ 714/38

OTHER PUBLICATIONS

Miller, Brian C. "Automated Test Generation for Computer Telephony Systems" CTI COnference, May 1999.
Automating Telecommunications Software Testing "Using Automated Test Generation to Make Dramatic Improvements in Software Reliability and Cost" Teradyne, Inc. 1997.
Apfelbaum et al. "Reducing the Time to Thoroughly Test at GUI" Software Quality Week Conference, May 1998.
Clarke, James M. "Automated Test Generation from a Behavioral Model" Software Quality Week Conference, May 1998.

* cited by examiner

*Primary Examiner*—Albert Decady
*Assistant Examiner*—James C. Kerveros

(57) ABSTRACT

This invention relates to an apparatus and an associated method that tests the response of a computer component. The apparatus includes a modeler, a tester, and a test generator. The modeler provides a model of the computer component object behavior. The tester provides stimulus values to be applied to the computer component object. The test generator converts the model of the computer component object behavior and the stimulus values into test script. The test script can be executed by an automated test executor.

32 Claims, 10 Drawing Sheets

FIG. 6

| ROW # | Test_ID | Main_Or | Main_Sw | Main_Re | Main_Ca | Main_Ca | Main_Ca | Main_Ca | Main_Ca | Main_St | Main_Ca | Main |
|---|---|---|---|---|---|---|---|---|---|---|---|---|
| 1 | test_1 | TaskGUI | RMSTHLO | Send | 1999 | Septemb | 2 | 11 | 45 | 00 | RDY | commer | CLLI |
| 2 | test_2 | TaskGUI | DMSTEST | Send | 1999 | Septemb | 2 | 11 | 45 | 00 | RDY | commer | CLLI |
| 3 | test_3 | TaskGUI | VIRT302 | Send | 1999 | Septemb | 2 | 11 | 45 | 00 | RDY | commer | CLLI |
| 4 | test_4 | TaskGUI | KRSLKSI | Send | 1999 | Septemb | 2 | 11 | 45 | 00 | RDY | commer | CLLI |

Model: tbl_info_Main Path: /export/home1/tcoe/connectvu/silk_gen/

Buttons: Save, Import, Close, Re-Tile, Add; Export, Reimport, Move, Remove, En/Disable

| test.case.ID | GUI_object_name 1 | GUI_object_name 2 |
|---|---|---|
| ID-1 | action-value | action-value |
| ID-2 | action-value | action-value |
| ⋮ | ⋮ | ⋮ |

MODELER REPRESENTATION OF TARGET COMPUTER COMPONENT

SAMPLE OF CODE PREPARED BY MODELER

⋮

LOG OPERATION START
OBJECT_TYPE=TEST.OBJECT
POSITION MOUSE POINTER TO OBJECT_TYPE
CLICK MOUSE TO HIGHLIGHT
PASTE VALUE INTO OBJECT_TYPE
LOG OPERATION OUTCOME

SAMPLE OF CONVERTER LOGIC

LOOP x

LOOP y

ASSIGN VAR TEST ← test_case_ID[x]

ASSIGN VAR OBJECT ← GUI_object_name[y]

ASSIGN VAR VALUE ← test_case_ID[x].GUI_object_name[y]

APPLY VALUE to TEST.OBJECT >>TEST_SCRIPT

RECORD action and expected result

NEXT y

NEXT x

TEST GENERATOR FOR CONVERTING A MODEL OF COMPUTER COMPONENT OBJECT BEHAVIOR AND STIMULUS VALUES TO TEST SCRIPT

BACKGROUND OF THE DISCLOSURE

1. Field of the Invention

The present invention relates to computer testing and, more particularly, testing input to computer components such as graphical user interfaces (GUI).

2. Description of the Background Art

Test script is computer language that is input to, and executed by, an automated test executor. The automated test executor simulates user input to a computer component such as a graphical user interfaces (GUI), computer hardware, or a computer software of a target computer. The automated test executor tests the response in one or more network locations to simulated inputs to the computer component. Such simulated inputs, in e.g. a GUI, include clicking a mouse, moving a mouse, or typing a prescribed text string. GUI's are considered one embodiment of a front end of a computer that includes the components that make up the screen that forms the application. Since computer components such as GUIs are becoming more complex as to be able to provide an almost unlimited number of user interface and computer operation scenarios, the complexity of the operation of the automated test executors that test the computer component is also increasing. Testing the computer component for desired operation can almost be as difficult and time consuming as writing the software for the computer component.

Test data input is manually "recorded". For a GUI, a human tester manually enters test data in the form of test script that, upon execution in the automated test executor, simulates input to the computer component(s) under test. To test computer components such as GUIs, the tester typically manually inputs data, manually moves mouse pointer, simulates mouse clicking, and manually captures the results of the GUI from the user inputs. For tests to be re-executed multiple times, e.g. regression tests, the automated test executor may provide a special "record" feature to be used before test execution. The automated test executor then executes the generated test script, and the results output from the automated test executor are reviewed, recorded, and/or compared to the desired operation of the target computer. The automated test executor automatically simulates such actions as manipulating mouse pointers or keyboard closures, in response to the input test script to simulate user input. The response throughout the network to the test script executed by the test executor can be captured for later replay and review. The recorded results from the automated test executor are then passed through an analysis engine. The analysis engine is typically manually performed to determine which test executions were successful. The analysis engine also tabulates the recorded results, such as a pass or fail status for each executed test.

It is also possible to include analysis functions within the test script code to provide immediate status determination for a test case. Failed test cases are typically reviewed manually with the human readable component of the test case output, and the recorded results are examined manually for determination of the scope of the defect. Specific test cases are re-executed through the automated test executor, if necessary, either automatically or manually to consider the operation of the automated test executor. A description of the defect may then be entered into a trouble tracking system, along with a test case identifier so coders or programmers can modify the operation, e.g. software code, of the GUI to correct the defect.

There is the need to allow testers to concentrate their efforts on devising specific tests rather than on the details of the test script generation or modification within the scope of testing and the use of automated test executors for computer components such as GUI, computer software, and/or computer hardware. The test script generation and modification themselves utilize code similar to programming code, i.e. an object oriented code. Thus there is a need in the art for a system that can convert stimulus values provided by a tester, and a model of the computer component object behavior to the test script that can be executed by automated test executors. The behavioral output of the system to simulated input to the computer component under test can be compared to expected results.

SUMMARY OF THE INVENTION

The invention relates generally to a method and associated apparatus for testing. More particularly, this invention relates to an apparatus that tests the response of a computer component to inputs. The apparatus includes a modeler, a tester, and a test generator. The modeler provides a model of the computer component object behavior. The tester provides stimulus values to be applied to the computer component object. The test generator converts the model of the computer component object behavior and the stimulus values into test script.

BRIEF DESCRIPTION OF THE DRAWINGS

The teachings of the present invention can be readily understood by considering the following detailed description in conjunction with the accompanying drawings, in which:

FIG. 6 shows one embodiment of a table including stimulus inputs to be input to a test generator process of the FIG. 5A model;

FIG. 9 shows one embodiment of a table including stimulus values as input by the tester of the test generator of FIG. 3;

FIG. 10a shows one embodiment of a model object as created by the modeler to simulate the input to a target computer component, e.g. a graphical user interface (GUI);

FIG. 10b shows one embodiment of pseudocode that represents the operation of the model object of FIG. 10a; and FIG. 11 shows one embodiment of pseudocode for converter logic used by the test generator of FIG. 3.

To facilitate understanding, identical reference numerals have been used, where possible, to designate identical elements that are common to the figures.

DETAILED DESCRIPTION

Figure 1:
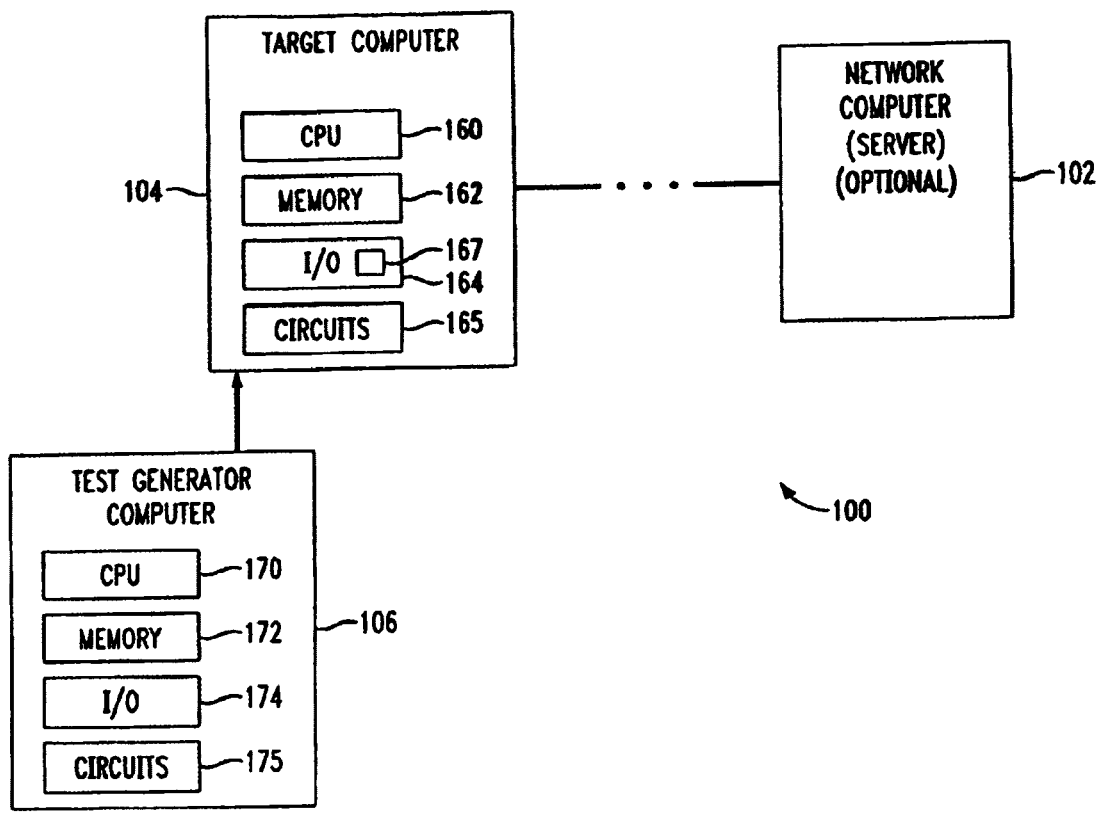
FIG. 1 shows a block diagram of one embodiment of a network including a target computer, a network computer, and a test generator computer that can be used in a test generation process.

FIG. 1 shows one embodiment of a network 100 that can utilize a test generator as described herein. The network 100 comprises a network computer 102, a target computer 104, and a test generator computer 106. The network computer 102 is envisioned to be, e.g. a server that stores spreadsheet, database, data and/or programs accessed by the target computer 104. The network computer 102 can be a server that, e.g., the target computer 104 (including a browser) communicates with to establish network, Internet, or Intranet connection. The network computer 102 is optional in this embodiment.

The target computer 104 includes a computer component, such as a graphical user interface (GUI), computer software, or computer hardware that is under test. The target computer 104 is envisioned be a client computer or a stand alone computer that comprises a central processing unit (CPU) 160, a memory 162, an input output interface (I/O) 164, a circuit portion 165, and a bus, not shown. The target computer 104 may be a general-purpose computer, an electronic circuit that responds to input signals, a microprocessor, a microcontroller, or any other known suitable type of computer. The CPU 260 performs the processing and arithmetic operations for the target computer 104. The target computer 104 interprets instructions from the automated test executor. (e.g., simulated key click, mouse movement, text input, etc.)

The memory 162 includes random access memory (RAM) and read only memory (ROM) that together store the computer programs including a network browser, operands, operators, dimensional values, configurations, and other data and computer instructions that are used to control the operation of test generator. The bus provides for digital information transmissions between CPU 160, circuit portion 165, memory 162, I/O 164, and other portions of the network 100 that either receive digital information from, or transmit digital information to, target computer 104.

I/O 164 provides an interface to control the transmissions of digital information between each of the components in target computer 104, and between the components of the target computer 104 and different portions of the network 100, e.g. the network computer 102 and/or the test generator computer 106. Circuit portion 165 includes all of the other user interface devices such as a display 167 and a keyboard, system devices, and other accessories associated with the target computer 104.

The display 167 of the target computer 104 typically utilizes a graphical user interface (GUI) also shown as 167, as is known in the art. GUI allows the user of the target computer 104 to "interact" with the target computer using such target computer inputs as, e.g., a mouse or a keyboard. There are three basic categories of GUI components: windows, menus, and controls. These three components are used in conjunction with each other to provide the window functionality. "Windows" are areas of the user's display device, often rectangular, that are displayed under the control of the target computer. Examples of windows include text windows, main windows, graphics windows, and dialogue boxes. "Menus" are GUI constructs that can be selected by, e.g. positioning a pointer over the menu and clicking a mouse, to display a new client window. Examples of menus include menu bar and a menu box. "Controls" are GUI constructs that allow the user to transmit commands or information to the GUI of the target computer. Examples of controls includes spin controls, scroll bars, radio boxes, push buttons, list boxes, labels, text boxes, and check boxes.

In one embodiment, the target computer 104 includes a computer component that is to be tested. The computer component under test may be included in the GUI 167 or any computer software stored in the memory 172 of the target computer 104 (or one or more of the memories of the network computer 102 and/or the test generator computer 106). Alternatively, the computer component under test may be computer hardware in any one of the computers 102, 104, and/or 106. Simulated input to the computer component by the automated test executor under test results in state changes to computers 102, 104, and/or 106. The state changes in computers 102, 104, and/or 106 may be monitored, recorded, and/or reviewed.

The test generator computer 106, that is distinct from, but communicates with, the target computer 104 in the embodiment shown in FIG. 1, comprises a central processing unit (CPU) 170, a memory 172, an input output interface (I/O) 174, a circuit portion 175, and a bus, not shown. The test generator computer generates test cases by converting input information including a model of the computer component object behavior and stimulus values to test script. The test script is executed by an automated test executor. In the embodiment shown in FIG. 1, the automated test executor is a process included as an application that is run by either the test generator computer 106, the target computer 104, the network computer 102, or two or more of computers 102, 104, and 106. The test generator computer 106 may be a general-purpose computer, a microprocessor, a microcontroller, or any other known suitable type of computer. The CPU 170 performs the processing and arithmetic operations for the test generator computer 106.

The memory 172 includes random access memory (RAM) and read only memory (ROM) that together store the computer programs, operands, operators, dimensional values, system configurations, and other parameters that control the test generator operation and the generation of test script to be used by the automated test executor. The bus provides for digital information transmissions between CPU 170, circuit portion 175, memory 172, and I/O 174. The bus also connects I/O 174 to the portions of the network 100 that either receive digital information from, or transmit digital information to, test generator computer 106.

I/O 174 provides an interface to control the transmissions of digital information between each of the components in test generator computer 106. I/O 174 also provides an interface between the components of the test generator computer 106 and the target computer 104. Circuit portion 175 comprises all of the other user interface devices such as displays and keyboards, system devices, and other accessories associated with the test generator computer 106. The I/O 174 includes a display screen that is used to display models and/or code that characterize the operation of the test generator computer.

In the embodiment network 100 shown in FIG. 1, the test generator computer 106 computer simulates input to the target computer by converting data into test script that is applied via an automated test executor to the computer component of the target computer 104. The test generator computer may be used, in the embodiment shown in FIG. 1, to monitor, record, and/or review the response of the target computer 104, the network computer, or the test generator computer to input to the computer component (e.g., the GUI, the computer software, the computer hardware, and/or other component(s)) of the target computer 104. The disclosure describes testing the response of one or more computers 102, 104, and/or 106 in the embodiment shown in FIG. 1 to input to a GUI associated with the target computer 104. It is envisioned that the concepts described herein may also be applied to testing of GUIs, computer software, computer hardware, or other computer components, such as electronic circuit boards and network interfaces, located in one or more of computers 102, 104, and/or 106. The test generator computer process executed by the test generator computer 106, the target computer 104, or the network computer 102 (FIG. 1) generates the test script that is executed by the automated test executor.

The test script input to the target computer simulates an input into, or records an output from, the target computer, the network computer, or the test generator computer. For instance, one test script command may relate to selecting one window in the GUI of the target computer at a prescribed location. Another test script command may relate to clicking on a selected window in the GUI to make a selected window active. Another test script command may relate to typing a prescribed text string into an active GUI window. Yet another test script command may relate to recording the text that is contained in a prescribed GUI window. Several test script commands may indicate, e.g. to position a pointer to a prescribed location (text window in the GUI of the target computer), and simulate a mouse key-click to make that window active, and as such the window is enabled to receive text input. Another test script command can simulate inputting a string of text into an enabled window. The test script can simulate a mouse pointer move to another location in the GUI and a mouse click. The state/data contained within the GUI, the target computer, the test generator computer, and/or the network computer can be recorded before, during, or after any particular test script action that may be utilized to understand the results of that particular test script action. The test script input into the automated test executor therefore can be used to simulate user input into the GUI, or other computer component, of the target computer 104.

Figure 2:
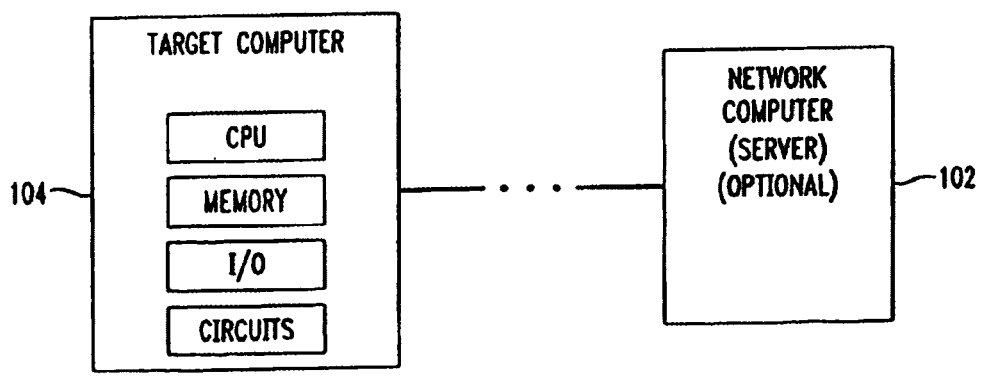
FIG. 2 shows a block diagram of another embodiment of a target computer that can be used in a test generation a process.
Figure 3:
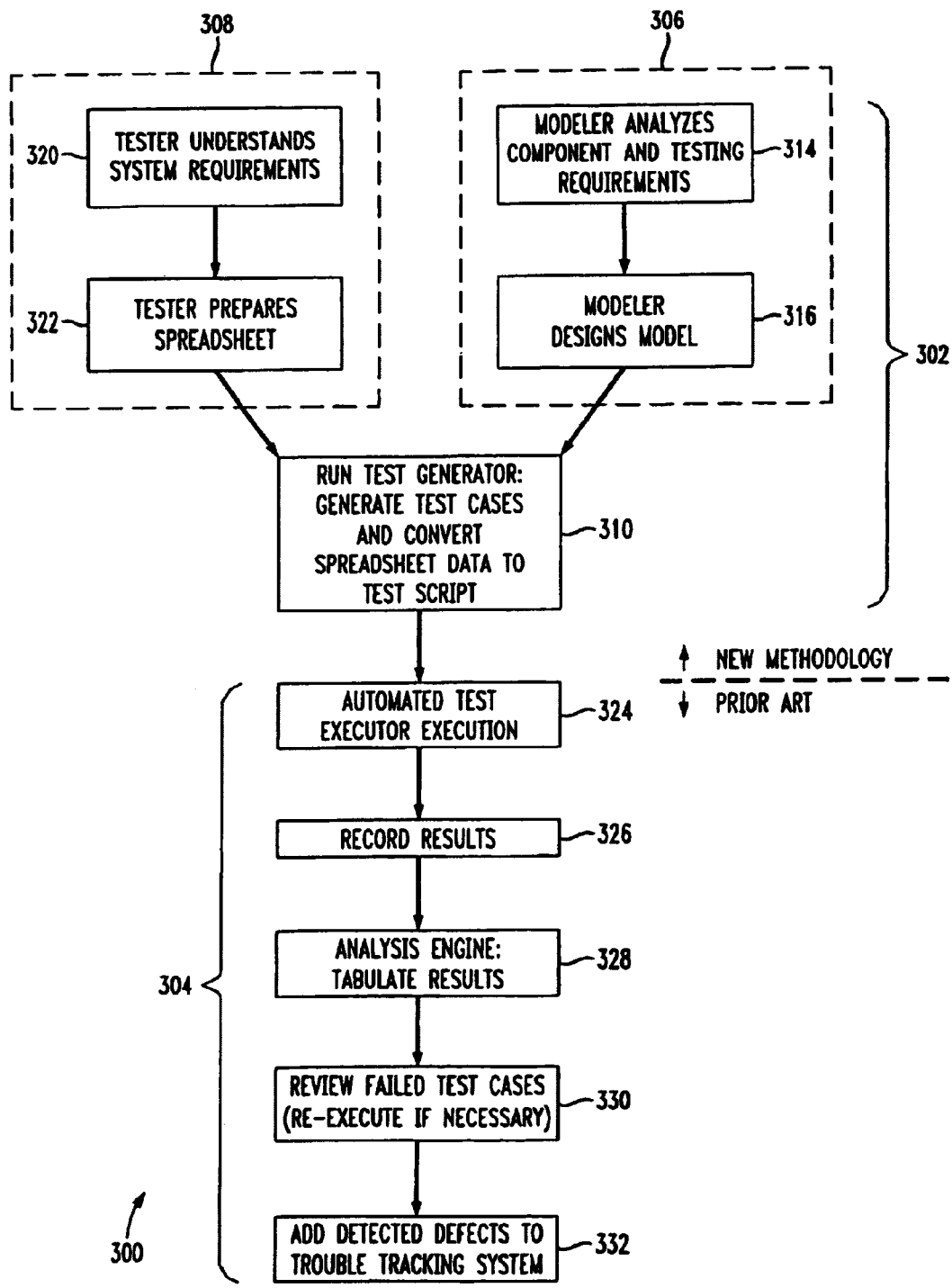
FIG. 3 shown one embodiment of a flow chart of a test method including modeler input, tester input, a test generator, and an automated test executor.
Figure 4:
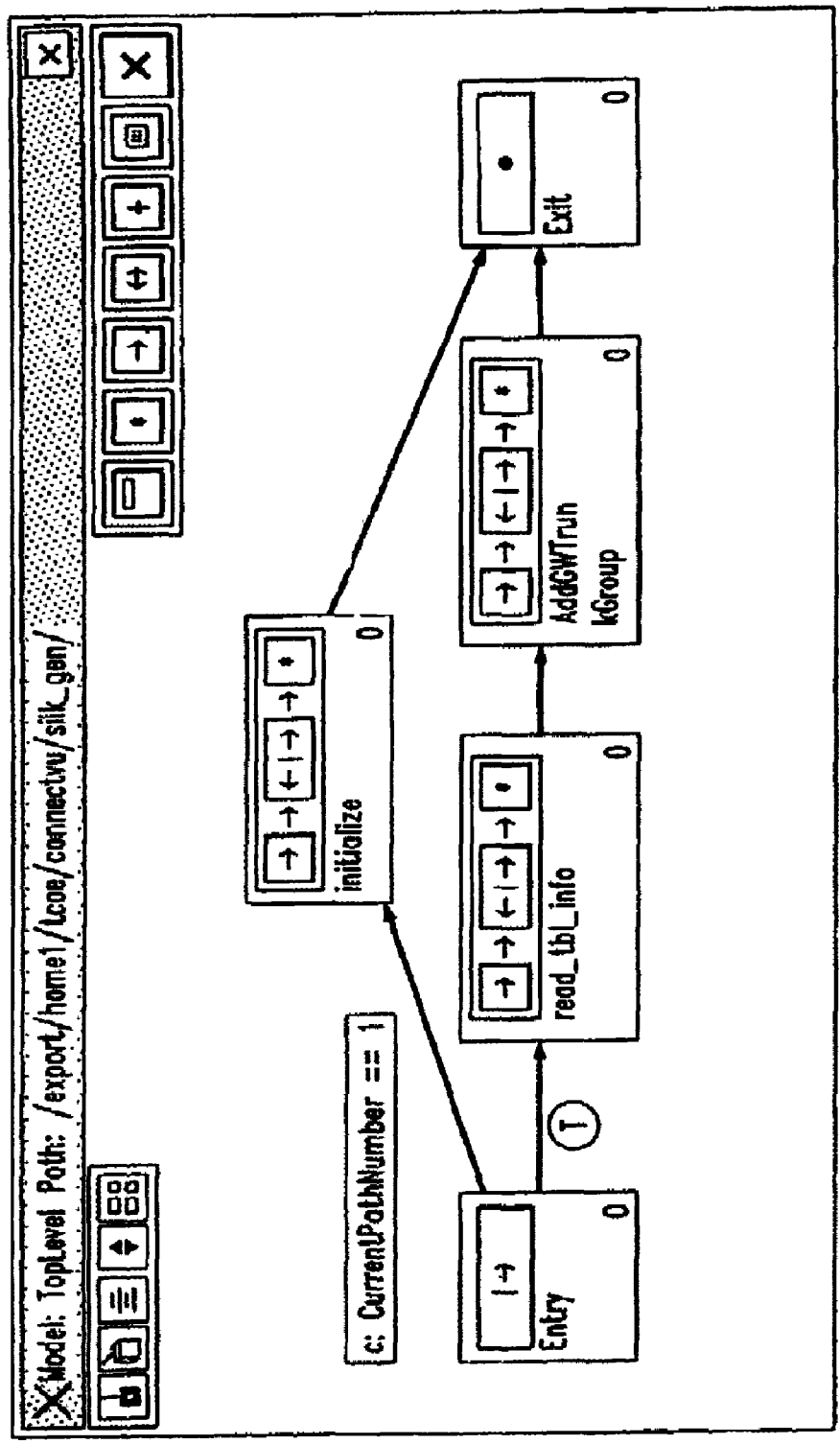
FIG. 4 shows one embodiment of a state model window for a sample-input table.

In the embodiment shown in FIG. 1, a separate test generator computer 106 interacts with the target computer 104 to perform the test generation function, the automated test executor function, and/or any one of the other functions shown in FIG. 3. In the embodiment shown in FIG. 2, the processes performed by the test generator computer 106 and the target computer are performed by a single target computer 104. An optional network computer 102, as shown in the embodiment in FIG. 1, is shown in the embodiment in FIG. 2 with which the target computer 104 may interact. The target computer 104 in FIG. 2 runs target computer processes either alone or in combination with the network computer 102, e.g. GUI, computer software, or computer hardware processes. The target computer 104 also runs test generator processes either alone or in combination with the network computer 102.

The tester function and the modeler function are two interrelated functions associated with the test generator process. In testing the response of one or more computers of the network 100 of FIG. 1 to input to the GUI, computer software, and/or other computer components, there are functions that are most concerned with system requirements of the test, i.e. system functions. The tester understands system requirements such as which fields may optionally be populated and which fields must necessarily be populated, and what data is valid for a specific field, e.g. numbers may not be permitted in certain fields. Other examples of system requirements that are prepared by the tester in a preferred embodiment include a particular field in a spreadsheet contains data such as letters and not numerical data; or that numbers in a particular field are within a prescribed minimum or maximum range, etc. There are also functions that are concerned with the testing requirements of the GUI. The modeler is trained to understand and relate to the testing requirements, e.g. what type of field is used, which components are to be used on the screen, which font is to be used, etc. The modeler does not necessarily understand the system requirements relating to the application. Examples of testing requirements that are understood, used, and/or prepared by the modeler include requiring that a field in a particular application (such as a spreadsheet) should be located at a particular position in a window, requiring the table of the spreadsheet or database to have a particular "look and feel", requiring that windows, menus, or controls in the GUI should have a specific dimension and be positioned at a specific position, ability to generate or display output, and/or ability to accept input, etc. The modeler function and/or the tester function can be performed either by a human, or alternatively be automated.

FIG. 3 shows a test script generation method that involves the use of tabular data (i.e. data relating to a spreadsheet, database, etc.) representing boundary values, etc. The tabular data is converted into test script that simulates input to the automated test executor using a test generator. The test script is run by the automated test executor of the target computer, and the results are recorded or compared to expectant values.

FIG. 3 shows one embodiment of a process diagram 300 that is run between the test generator computer 106 (of FIG. 1), the network computer, and/or the target computer 104 of FIG. 1. The process diagram 300 tests the response(s) of computers 102, 104, and/or 106 to simulated input to a computer component under test such as a GUI, computer software, or computer hardware. The process diagram involves the conversion of data into test script, the execution of the test script by the automated test executor, and the recording, tabulation, and review of the results from the automated test executor. The process diagram 300 is segmented to include test input 302 and a test output 304. The test input 302 includes a modeler-input segment 306, a tester input segment 308, and a conversion segment 310.

Figures 9, 10A, 10B:
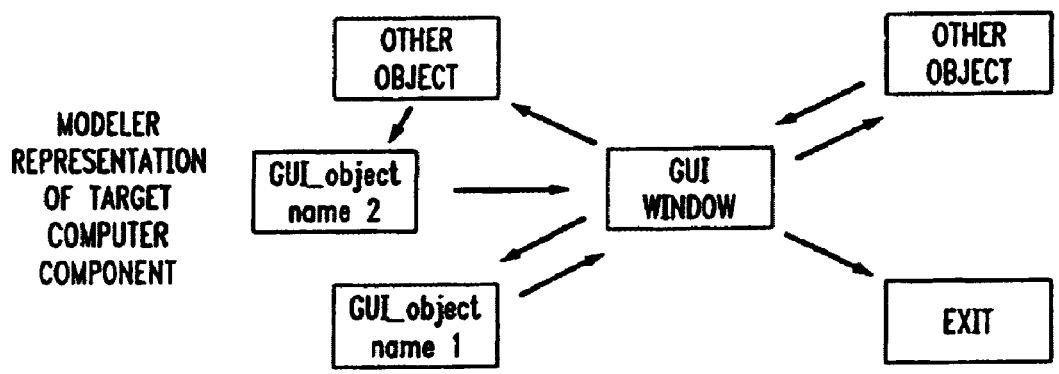

The modeler input segment 306 includes block 314 and block 316. In block 314, the modeler analyzes the computer component and testing requirements. In block 316, the modeler designs the model. One embodiment of the preparation of the model object is shown in FIGS. 10a and 10b. The tester input segment 308 includes blocks 320 and 322. In block 320 the tester determines the system requirements.

FIG. 10a shows one embodiment of a representation of a target GUI window. FIG. 10b shows one embodiment of pseudocode, such as would be prepared by the modeler, that would be input to the test generator process 310 to generate a model object. The specific pseudocode in FIG. 10b relates to simulating positioning the mouse pointer to a GUI of the target computer 104 of FIG. 1, and clicking the mouse. The code shown in FIG. 10b is preferably provided in an object oriented code, which may be understandable to the automated test executor. The model prepared by the modeler can be populated with stimulus values provided by the tester. These stimulus values, such as boundary conditions, mouse clicks, button selections, etc. test the response of the computer component to prescribed simulated input. Stimulus values are considered as those represented by tabular value input for boundary conditions, etc. that are used as input to the test generator 310 of FIG. 3 and that are combined with a model to be converted by the test generator into test script.

In block 322, the tester prepares the stimulus values to be input into the spreadsheet or database. The stimulus values may include boundary parameters containing one or more values for certain fields that are outside the prescribed allowable ranges for that field, as well as other values that are within prescribed limits. The stimulus values may also include, e.g., tabular data such as a form that may be contained in a spreadsheet or database, written or oral (i.e. speech recognition) instructions to the computer, etc.

One embodiment of general stimulus value input from the tester is shown in FIG. 9. The generic stimulus values labeled in FIG. 9 as "action-value", is input to the test generator process. The stimulus values are arranged in the form of a table in FIG. 9, though the stimulus values may take the form of boundary parameters, written or oral instructions to a computer, etc.

The output from the tester input segment 308 and the output from the modeler input segment 306 are combined in block 310 in the embodiment of FIG. 3, in which the test generator generates test cases by converting the combined stimulus values and model into test script.

The logic used by the target computer 104, the network computer 102, and/or the test generator computer 106, of FIG. 1, in converting the data input to the test generator by the respective tester and modeler, is shown respectively in FIGS. 9 and 10. The logic used to convert the stimulus values and the model into test script is shown in FIG. 11. The FIG. 11 converter logic may be performed in the network computer 102, the target computer 104, and/or the test generator computer 106 in the embodiment of FIG. 1. The LOOP X and LOOP Y statements input the stimulus values input from the tester as shown in FIG. 9. The three "Assign Var" statements apply the stimulus value to the test object, the test object being modeled by the modeler. The "Apply Value" statement acts to append the applied stimulus value as test script that is in a form that can be input to the automated test executor. The record action statement is optional, and may provide an alternate format of the test script in a human readable format to be used by, e.g. a human tester. The test script in readable format can be used in the analysis engine 328 in FIG. 3. Alternatively, the human readable test script can be analyzed if the test case fails.

The test script contains computer instructions that will simulate input to the computer component, e.g. GUI, computer software and/or computer hardware of the target computer. Boundary values, e.g., stimulus values that are both within and without the prescribed limits of the computer component under test, test the operation of the computer component and/or the response of computers 102, 104, and 106 to the input on the computer component. These computer instructions are executed in the automatic test executor process that resides in the computers 102, 104, and/or 106. The displayed or stored results after application of the stimulus values to the GUI, or the computers 102, 104, and/or 106 of FIG. 1 are monitored, recorded, or reviewed.

The test output 304 includes blocks 324, 326, 328, 330, and 332 as shown in the embodiment of FIG. 3. Block 324 is an automated test executor execution block. The automated test executor preferably consists of a program running on the same target computer that is executing the GUI, though portions of the automated test executor may also be running on the network computer 102 and/or the test generator computer 106 of the embodiment of FIG. 1. Test script is the language of the automated test executor. The automated test executor simulates actions that a user interacting with the GUI of a target computer would perform, e.g. moving a mouse, clicking a mouse, entering text using a keyboard. The automated test executor may be considered as an application program running in addition to the operating system(s) of the network computer 102, the target computer 104, and/or test generator computer 106 of the embodiment of FIG. 1.

One embodiment of automated test executor is commercially available as Silktest®. With commercially available test executors, the tester trains the automated test executor by manually entering a test case as the automatic test executed records the outcome. The test script generated by the test generator that is input to the automated test executor causes the automated test executor to perform a prescribed operation. These recorded actions are in the form of test script that may be later used for automatic test execution. The automated test executor 324 of the embodiment of FIG. 3 also has capabilities to record results in the computer component, and/or the computers 102, 104, and/or 106 of FIG. 1 to stimulated input to the computer component (e.g. GUI, computer hardware, and/or computer software in response to test script commands received from the test generator 310 of the embodiment of FIG. 3. Block 326 is a record results block that is typically manually performed. The results of the tested application operations as well as the results from the automated test executor execution are recorded in block 326. Such recording may be included in the form of generated test script. The results from the automated test executor execution includes, e.g., that a specific window could not be opened because too many windows are presently opened.

Block 328 is an analysis engine block in which the results are tabulated. The analysis engine block is typically performed manually, though it may be automated. The recorded results from block 326 are input to the analysis engine. The automated test executor determines which test executions were successful and which test executions encountered failed for one reason or other. The analysis engine tabulates the recorded results, such as providing a Pass or Fail status. As a result of automating the automated test executor, the automated test executor can run for extended time without human interaction to provide a more rigorous test of the operation of the GUI. The automated test executor can therefore provide a large number of results. The analysis engine goes through all results and, e.g., tabulates error conditions. This tabulation provides for more efficient review of the automated test executor results than if the results were simply reviewed manually. The tester then periodically reviews the tabulated results output from the analysis engine. It is also possible to incorporate analysis functions within the test script code for immediate status determination.

In block 330, the failed test cases are manually reviewed with the human readable component of the test case output and the recorded results are examined manually for determination of the scope of the defect. Specific test cases can be re-executed if necessary either automatically or manually. In block 332, detected defects are added to a trouble tracking system. A description of the defect is entered into a trouble tracking system, along with a test case identifier. The trouble tracking system is utilized by, e.g., programmers, coders, and testers. In the code generation process, the code of the application program in the target computer, under test by the test executor, can be corrected or re-written by coders and programmers to remedy the code defects noted in the trouble tracking system.

The test generator 310, one embodiment of which uses the Model Reference Technology as with the TESTMASTER® program of TERADYNE, INC of Boston, Mass., is used to generate test cases. These test cases consist of multiple components, principally:

A. A test script that is in a form that can be input into, and understood by, an automated test executor such as Segue's SILKTEST® from Segue Software, Inc.; and
B. An optional human readable portion describing each test.

Other components of the test generator may include:
C. A test controlling file for a Test Manager, one embodiment of which uses TESTEXPERT® from Silicon Valley Network;
D. An expected results file for comparison after test execution;
E. Executable script or code that obtain expected test results independently of the test itself;
F. Executable script or code to pre-set or reset a device, file, or database.

Components C to F may be separate entities from, or part of, the principal components. The test script (component "A" above) contains fabricated commands generated specifically for each particular test. Such commands simulate potential user input, and these commands may provide for test control, test monitoring, results recording, and test status.

The automated test executor using test script from the test generator tests the operation of the GUI of the target computer to simulated user input. The input to run the test generator for this embodiment can be subdivided into two basic functions: the tester function and the modeler function. The tester function relates to the system requirements (for instance, documented features) and provides tabular data for the spreadsheet or database that represents user input. The modeler function relates to the tester requirement and analyzes the needs of the tester. The modeler function, e.g., generates the headings for the spreadsheet or database, the look and feel of the GUI, etc.

It is likely that one particular modeler would be associated with a particular database or spreadsheet, and would structure the model in a manner that input can be received from one or more testers. It is possible that the different testers have input to the tabular data in different formats. The modeler may configure the model to be able to receive data from each one of a plurality of distinct testers, and each of the testers may provide tabular data in a different format. The tester knows what is to be tested but doesn't have to go through the effort of creating the test script. This embodiment provides for an effective division of work between the modeler and the tester.

Depending on the tester's needs, the modeler would design a model representing the behavior of the computer component to test aspects of the computer components characteristics (for instance, size or color of a window of a GUI), ability to generate output (for instance, a text or graphical display of an object in a GUI), ability to accept input (for instance a mouse click or keyboard text entry to be input to a GUI), or navigation linkages, e.g., transferring control between different windows of a GUI. Oftentimes, the tester is concerned with testing a user scenario of entering data in multiple fields and on multiple windows. The tester's data entries would be converted by the model into the test script code used for this testing.

The use of the disclosed conversion code, one embodiment of which is shown in FIG. 11, allows for the conversion of test cases written for manual testing to be converted to automated test script. The disclosed method may also be used to generate functional tests before the final program code is available, thereby enabling the testers to more efficiently carry out their testing responsibilities.

System requirements embodiment of the of test generator 310 shown in FIG. 3 including the modeler input of the model object, one embodiment shown in FIGS. 10a and 10b; the stimulus value input by tester in the embodiment shown in FIG. 9; and the embodiment of conversion process to test script shown in FIG. 11 includes:

A. The capability to prepare information in the form to be tested on the component to be tested such as spreadsheet information, to be input into the GUI, computer software, or computer hardware of the target computer.
B. Interoperability of the test generator with model designated by modeler, the modeler not being familiar with system requirements but being familiar with testing requirements;
C. The capability to generate test cases;
D. The capability to convert the system requirements and the testing requirements into test script in a form that can be understood by automated test executor; and
E. The capability to feed test script into the automated test executor to test a computer component of the target computer.

The tabular data may be generated from another model or the front end portion of this disclosed method's test generation model, rather than from a human tester. The modeler can rely on the tester's knowledge and test experiences as input to the model.

Figure 5A:
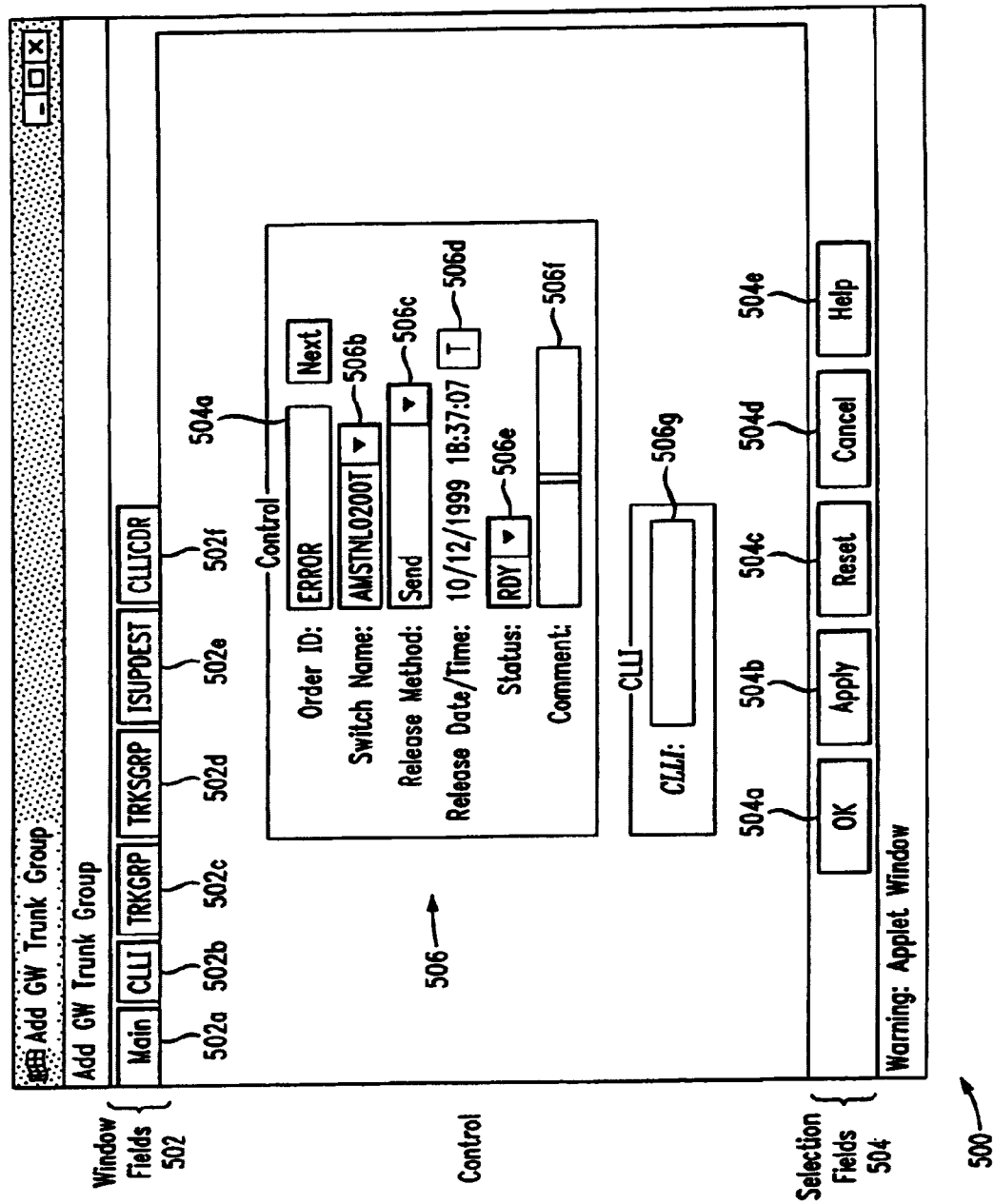
FIG. 5A shows one embodiment of a computer component, e.g. GUI, to be tested.

FIG. 5A shows one embodiment of a main window 500 that appears on the GUI 167 in the embodiment of FIG. 1 of the target computer. In this disclosure, the computer component under test is exemplified by the GUI 167 of the target computer in the embodiment shown in FIG. 1. The main window 500 is an integral portion of the GUI. The input over the main window 500 is simulated by the test script generated by the run test generator block 310 in FIG. 3. The test script is executed by the automated test executor to simulate the input to the computer component, e.g. GUI 167 in FIG. 1, under test. A user may select prescribed windows in the test generator computer by selecting the window menus 502b to 502f shown in a main window 500 to be displayed in a GUI.

The main window 500 of the target GUI comprises a main window field 502, a plurality of menu fields 502b to 502f, and a plurality of control fields 504a to 504e and 506a to 506g. The window field 502 comprise, e.g., main window 506. The menu fields comprise, e.g., a CLLI window menu 502b, TRKGRP window menu 502c, a TRKSGRP window menu 502d, an ISUPDEST window menu 502e, and a CLLICDR window menu 502f. Clicking on any of the window menus 502a–502f will cause the window corresponding to that particular window menu to appear as the active window 500. The control fields 504 include, e.g., an OK control 504a, and apply control 504b, a reset control 504c, a cancel control 504d, a help control 504e, and a plurality of controls 506a to 506g associated with the main window 500. Selecting any of the selection controls 504a to 504e will cause the test generator computer 106 to perform the action indicated in the particular selection control.

The main window 500 includes a plurality of control fields 506 that comprises, e.g., an order ID field 506a, a switch name field 506b, a release method field 506c, a release date/time field 506*d*, a status field 506*e*, and a comment field 506*f*. The user may input data into each of the control fields 506*a* to 506*g* to cause the test generator computer 106 to generate and put into the target computer 104 that simulates an action, such as may represent a single computer instruction to the target computer.

Figure 5B:
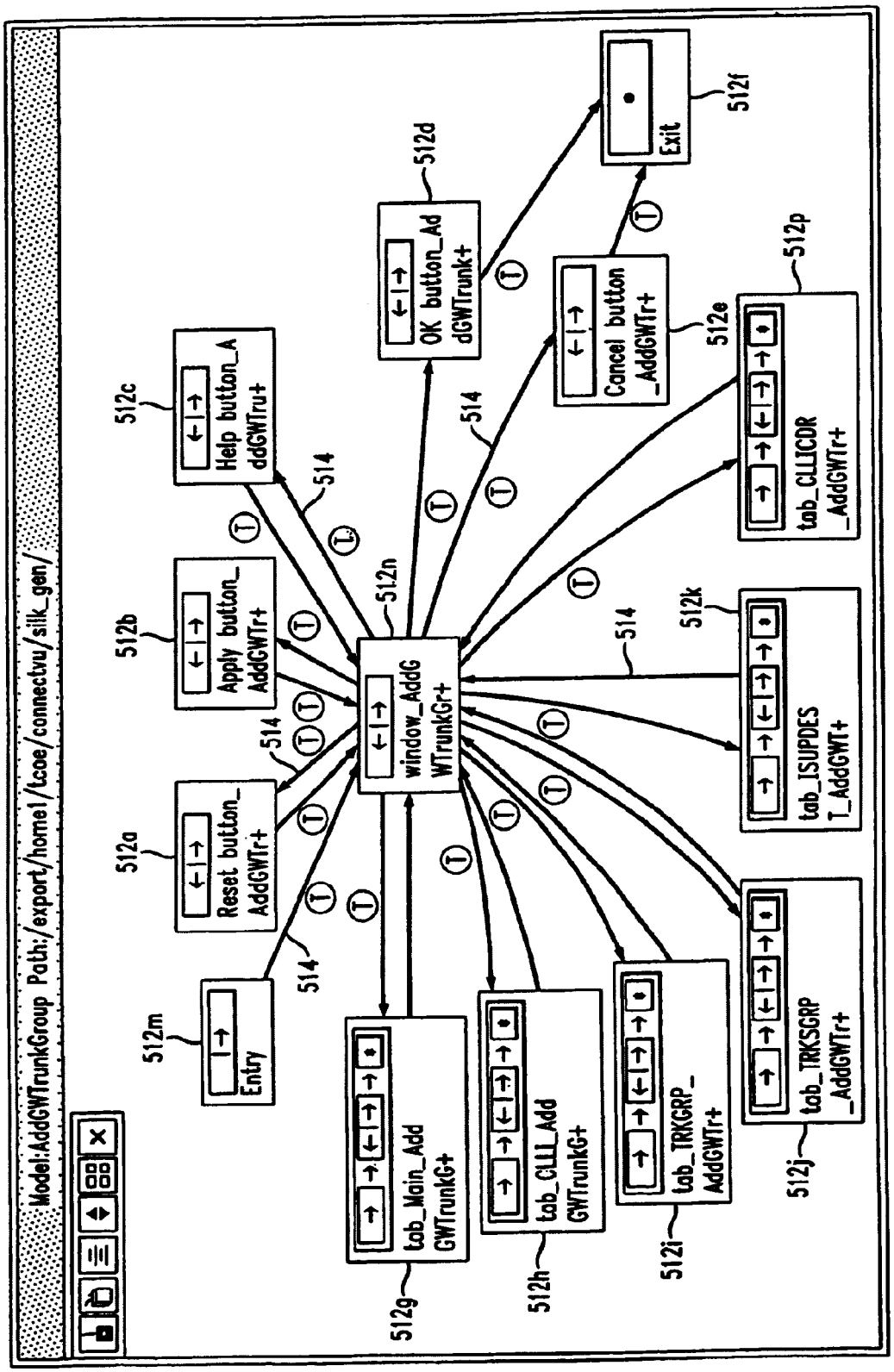
FIG. 5B shows one embodiment of state model that defines the states shown in the display shown in FIG. 5A.

FIG. 5B is a state model diagram that models potential control or menu selections by the user that models the operation of the main window 500 of FIG. 5A. The state model diagram represents the logic that may be applied to the main window 500 of the GUI by the test generator process 310 combined with the test execution process of FIG. 3. The controls 504*a* to 504*e* on the main screen 500 of FIG. 5A are represented by respective states 512*a* to 512*e* of FIG. 5B. The menus 502*a* to 502*f* on the main screen 500 are represented by respective states 512*g* to 512*p*. The connectors 514, only a few of which are numbered, represent the various permitted successive paths between the different states that the test generator generates the test script input into the automated test executor instructs the target computer to follow. Certain ones of the connectors 514 includes model transmission icons, labeled as "T" in the embodiment shown in FIG. 5B. For example, if the GUI of the target computer 104 is in state 512*n*, and the TRKSGRP menu 502C in FIG. 5A is selected, then the logic diagram in FIG. 5B indicates that the test generator should instruct the GUI target computer to be in state 512*j*. The test generator computer 106 functions by monitoring, recording, and/or ensuring that the target computer properly follows through the various states 512*a* to 512*n* according to the input from the test generator computer.

In FIG. 6, each test case representing input to be converted by the test generator to test script is stored as a separate row 608*a* to 602*d*. Each row 602*a* to 602*d* includes one entry represented by a plurality of columns 604*a* to 604*k*. Each column entry 604*a* to 604*k* of each row 602*a* to 6502*d* represents one data field for one menu or control input that has been applied to the window shown in FIG. 5A. For example, field 604*c* represents a task as performed on selecting a certain field in the target computer 104 of FIG. 1, as indicated in the states 514*a* to 512*n*, shown in FIG. 5B. As such, FIG. 6 includes the specific spreadsheet stimulus values input to the model, as indicated generally in FIG. 9. Each row 602*a* to 602*d* represents one test case for the main window 500 of the computer component, e.g. GUI 167 in the embodiment of FIG. 1, of the target computer shown in FIG. 5A.

Figure 7:
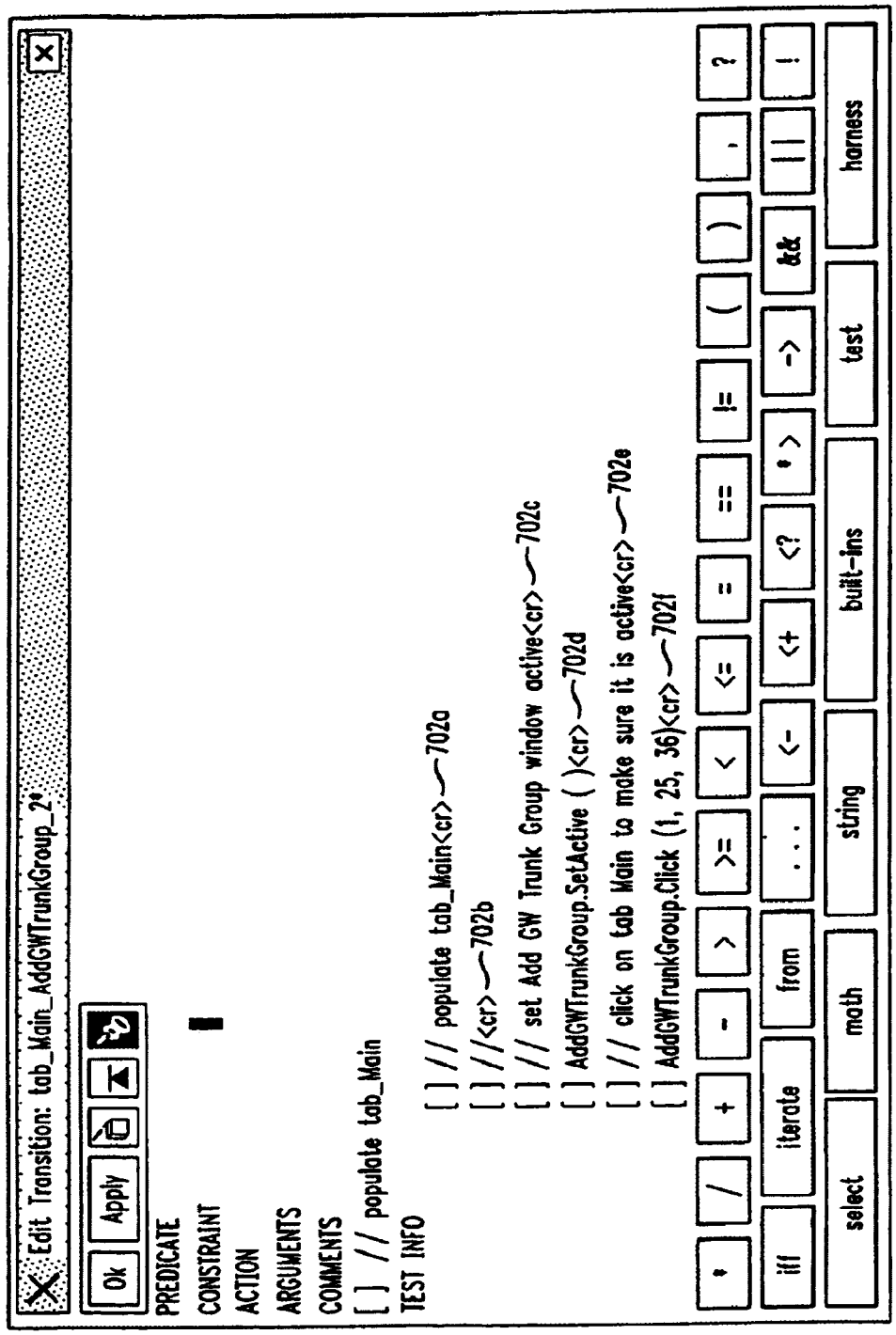
FIG. 7 shows one embodiment of a test generator computer display displaying a portion of generated test script that can be applied to the automated test executor of FIG. 3.

FIG. 7 shows a portion of an output program from a test generator including generated test script generated in response to input test cases including stimulus values of the type shown in FIG. 6. The test script is applied to the automated test executor. The automated test executor thereby simulates input in the computer component, e.g. GUI 167 in the embodiment of FIG. 1, of the target computer that can be, e.g. monitored, analyzed, and/or recorded. Each line 702*a* to 702*f* in FIG. 7 represents a generated line of test script that represents a portion of a program to be input to the target computer component, which was generated in response to the input, as indicated in rows 602*a* to 602*d* in FIG. 6. The lines of the generated test script lines 702*a* to 702*f* is executed by the automated test executor to simulate input to the target computer 104 of FIG. 1 is representative of a portion of the complete test script. The automated test executor test script execution actions are performed by a user on the GUI of the target computer itself.

As such, the output on the display of the target computer should reflect the input test script as being applied by the test generator computer.

Though FIG. 1 shows a distinct test generator computer 106 from the target computer 104, it is considered possible that a test generator is actually a separate process running within the target computer itself. As such, the target computer can generate test data that is executed by itself via the automated test executor function.

Figure 8:
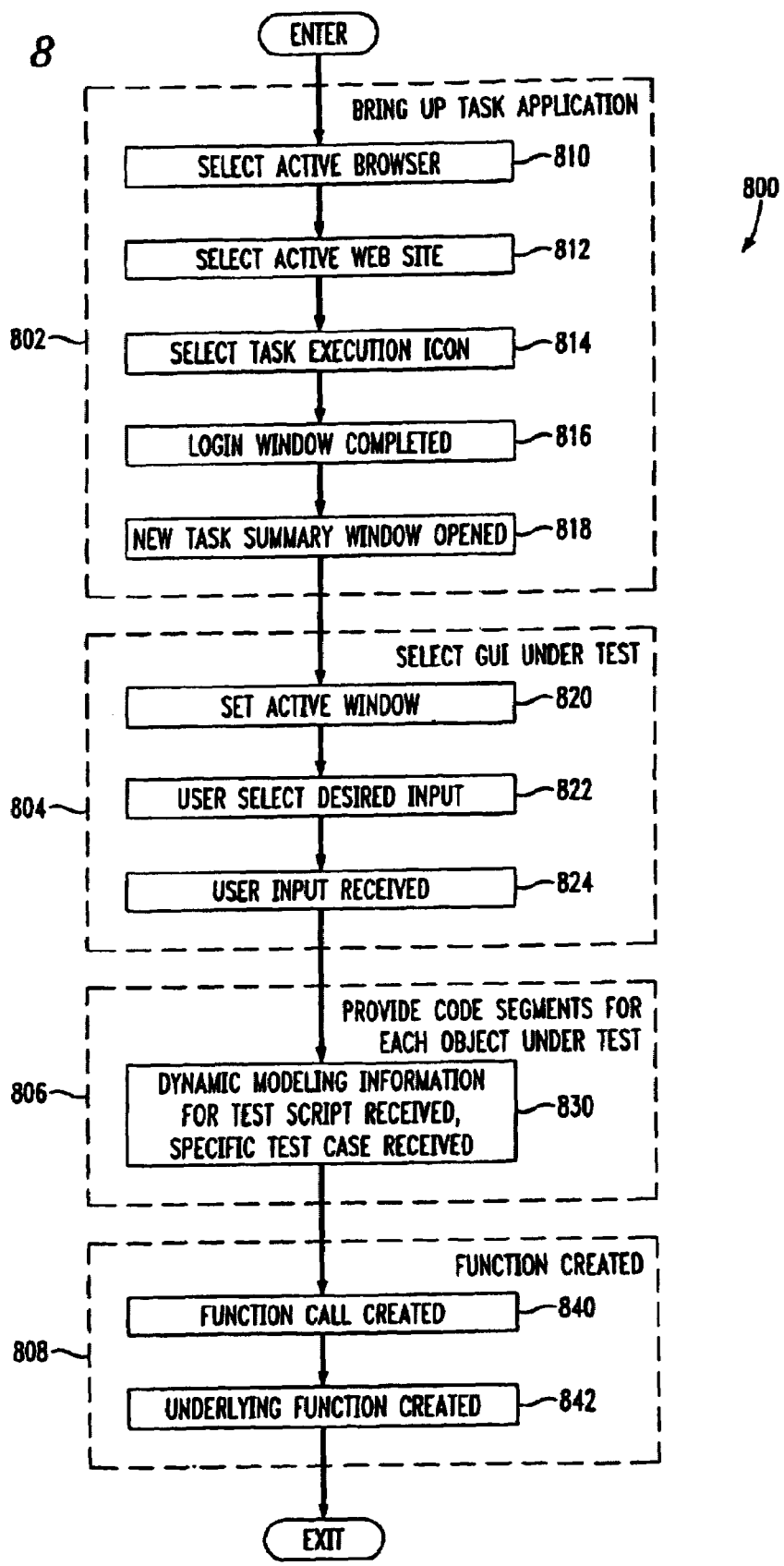
FIG. 8 shows a flowchart of one embodiment of a method performed by a test generator.

FIG. 8 is a flowchart of one embodiment of a test generation method 800 of the test generator process that is generated by one or more of computers 102, 104, and/or 106 in the embodiment of FIG. 1. The method 800 can be subdivided into four sections. The first section 802 is concerned with bringing up the application and is used once prior to executing the test case(s). Initially, the procedure may be performed manually by the tester. The second section 804 of the method 800 selects the Window of the GUI in the target computer under test, and the second section begins the test case of each window associated with each test case. A test generator such as TESTMASTER® would use the code associated with the second section to start each test case. The third section 806 of the method 800 provides code segments for each object under each tab heading for the GUI Window under test. The third section 806 is used by the test generator to form the specific test case. Various fields corresponding to test case data would be substituted by variable data representations within the test generator. The fourth section 808 provides a function call and the underlying functions to facilitate the selection of a popup choice. With one function declaration in the model, the use of the function call reduces the number of lines generated for the test cases.

The first section 802 includes blocks 810, 812, 814, 816, and 818. The method 800 starts with block 810 in which the active browser, e.g. NETSCAPE NAVIGATOR® or INTERNET EXPLORER®, is set. The method 800 continues to block 812 in which the active web site, according to a prescribed URL selected by the user, is selected. The method 800 continues to block 814 in which the task execution icon is selected. The method continues to block 816 in which the login window is completed. The method continues to block 818 in which a new task order window is opened that represents opening an application specific window, such as Microsoft WORD, EXCEL, etc. The first section 802 is performed prior to the test generator generating the test script as per block 310 of FIG. 3.

The second portion 804 includes blocks 820, 822, and 824. In block 820, the method 800 sets the active window. In block 822, the method 800 provides a list (e.g. pop up) by which the user can select the desired input. The method 800 continues to block 824 in which the controller receives input from the user as to the selected window.

The third portion 806 includes block 830 in which the dynamic modeling information for the test script is commenced. In block 830, the specific test case is formed.

The fourth portion 808 includes blocks 840 and 842. In block 840 the function call is created. In block 842 the underlying function is created to facilitate accessing the pop-up choice.

Although various embodiments that incorporate the teachings of the present invention have been shown and described in detail herein, those skilled in the art can readily devise many other varied embodiments that still incorporate these teachings.

What is claimed is:

1. A method of generating a test script for testing at least a portion of a system, comprising:
   generating stimulus values by processing system requirements, the system requirements including a plurality of system rules by which the system operates, wherein at least a portion of the stimulus values comprise values conflicting with at least a portion of the system rules;
   generating a model of a computer component object behavior by processing the system requirements and testing requirements; and
   converting the stimulus values and the model of the computer component object behavior into a test script.

2. The method of claim 1, wherein the stimulus values are generated by a tester.

3. The method of claim 1, wherein the model of the computer component object behavior is generated by a modeler.

4. The method of claim 1, wherein the test script is executed by a test executor.

5. The method of claim 4, wherein results are generated in a computer network that includes the computer component in response to the executed test script.

6. The method of claim 5, wherein said results are tabulated.

7. A method of generating a test script for testing at least a portion of a system, comprising:
   inputting system requirements into the test generator, the system requirements including a plurality of system rules by which the system operates;
   inputting testing requirements into the test generator, wherein the testing requirements are input from a separate source from the system requirements;
   converting the system requirements and the testing requirements into a model of a computer component object behavior;
   converting the system requirements into stimulus values, wherein at least a portion of the stimulus values comprise values conflicting with at least a portion of the system rules; and
   converting the stimulus values and the model of a computer component object behavior into the test script.

8. The method of claim 7, wherein a tester inputs the system requirements.

9. The method of claim 7, wherein a modeler inputs the testing requirements.

10. The method of claim 7, wherein a test executor tests the response of a computer component to the test script.

11. The method of claim 7, further comprising:
    executing the test script.

12. The method of claim 11, wherein results are generated in response to the executed test script.

13. The method of claim 12, wherein the results are tabulated.

14. An apparatus for generating a test script for testing at least a portion of a system, comprising:
    a first input that inputs system requirements into a test generator, the system requirements including a plurality of system rules by which the system operates;
    a second input, distinct from said first input, that inputs testing requirements into the test generator; and
    a converter adapted for:
       converting the system requirements and the testing requirements into a model of a computer component object behavior;
       converting the system requirements into stimulus values, wherein at least a portion of the stimulus values comprise values conflicting with at least a portion of the system rules; and
       converting the stimulus values and the model of a computer component object behavior into the test script.

15. The apparatus of claim 14, further comprising:
    a tester that applies the system requirements to said first input.

16. The apparatus of claim 14, further comprising:
    a modeler that applies the testing requirements to said second input.

17. The apparatus of claim 14, wherein a test executor is used to test the response of a computer component to the test script.

18. The apparatus of claim 14, further comprising:
    a test executor that executes the test script generated by the test generator.

19. The apparatus of claim 18, wherein results occur in a computer component of a network in response to the executed test script.

20. The apparatus of claim 19, further comprising an analysis engine that tabulates the results in the network.

21. A method of generating a test script for testing at least a portion of a system, comprising:
    providing a model of a computer component object behavior, wherein the model of the computer component object behavior is generated by processing system requirements and testing requirements, the system requirements including a plurality of system rules by which the computer component operates;
    providing stimulus values to be applied to the computer component object, wherein the stimulus values are generated by processing the testing requirements, wherein at least a portion of the stimulus values comprise values conflicting with at least a portion of the system rules; and
    converting the model of the computer component object behavior and the stimulus values into a test script.

22. The method of claim 21, wherein an automated test executor executes the test script.

23. The method of claim 21, wherein a modeler provides said model of the computer component object behavior.

24. The method of claim 21, wherein an object behavior of a graphical user interface (GUI) is said computer component object behavior.

25. The method of claim 21, wherein an object behavior of computer hardware is said computer component object behavior.

26. The method of claim 21, wherein an object behavior of computer software is said computer component object behavior.

27. The method of claim 21, wherein a tester provides the stimulus values to be applied to the computer component object.

28. The method of claim 21, wherein a test generator converts the model of the computer component object behavior and the stimulus values into test script.

29. An apparatus of generating a test script for testing at least a portion of a system, comprising:
    a modeler providing a model of a computer component object behavior, the model of the computer component object behavior generated by processing system requirements and testing requirements, the system requirements including a plurality of system rules by which the computer component operates;

a tester providing stimulus values to be applied to the computer component object, the stimulus values generated by processing the testing requirements, wherein at least a portion of the stimulus values comprise values conflicting with at least a portion of the system rules; and a test generator converting the model of the computer component object behavior and the stimulus values into a test script.

30. The apparatus of claim 29, wherein an object behavior of a graphical user interface (GUI) is said computer component object behavior.

31. The apparatus of claim 29, wherein an object behavior of computer software is said computer component object behavior.

32. The apparatus of claim 29, wherein an object behavior of computer hardware is said computer component object behavior.

* * * * *